(12) United States Patent
Henocq et al.

(10) Patent No.: US 8,462,778 B2
(45) Date of Patent: Jun. 11, 2013

(54) METHOD AND DEVICE FOR TRANSMITTING DATA

(75) Inventors: Xavier Henocq, Melesse (FR); Frédéric Maze, Langan (FR)

(73) Assignee: Canon Kabushiki Kaisha, Tokyo (JP)

( * ) Notice: Subject to any disclaimer, the term of this patent is extended or adjusted under 35 U.S.C. 154(b) by 47 days.

(21) Appl. No.: 12/246,372

(22) Filed: Oct. 6, 2008

(65) Prior Publication Data
US 2009/0097483 A1  Apr. 16, 2009

(30) Foreign Application Priority Data
Oct. 15, 2007 (FR) .................................... 07 58316

(51) Int. Cl.
*H04L 12/28* (2006.01)
(52) U.S. Cl.
USPC ........... 370/389; 370/229; 370/235; 370/392; 370/412; 709/223; 709/224
(58) Field of Classification Search
USPC ............... 370/229, 230, 235, 236, 392, 394, 370/412; 709/223, 224
See application file for complete search history.

(56) References Cited

U.S. PATENT DOCUMENTS

| 5,936,940 | A | * | 8/1999 | Marin et al. | 370/232 |
| 6,119,235 | A | * | 9/2000 | Vaid et al. | 726/11 |
| 6,141,324 | A | * | 10/2000 | Abbott et al. | 370/236 |
| 6,215,769 | B1 | * | 4/2001 | Ghani et al. | 370/230 |
| 6,272,539 | B1 | * | 8/2001 | Cuomo et al. | 709/223 |
| 6,292,834 | B1 | * | 9/2001 | Ravi et al. | 709/233 |
| 6,496,520 | B1 | * | 12/2002 | Acosta | 370/474 |
| 6,643,496 | B1 | * | 11/2003 | Shimoyama et al. | 455/69 |
| 6,958,998 | B2 | * | 10/2005 | Shorey | 370/395.42 |
| 7,099,273 | B2 | * | 8/2006 | Ha et al. | 370/229 |
| 7,304,951 | B2 | * | 12/2007 | Rhee | 370/235 |
| 7,426,305 | B2 | | 9/2008 | Denoual | |
| 7,496,040 | B2 | * | 2/2009 | Seo | 370/238 |

(Continued)

FOREIGN PATENT DOCUMENTS

EP  1 422 892  5/2004

OTHER PUBLICATIONS

U.S. Appl. No. 12/123,317, filed May 19, 2008.

(Continued)

*Primary Examiner* — Andrew Lai
*Assistant Examiner* — Andrew C Lee
(74) *Attorney, Agent, or Firm* — Fitzpatrick, Cella, Harper & Scinto (57) ABSTRACT

The method of transmitting data packets associated with an importance level comprises a step (305) of estimating available rate on the network. In case a variation is detected in estimated available rate greater than a first predetermined value, determination is made (309-317) of whether there is an increase in the round trip time on said network that is greater than a second predetermined value. If yes, the data packets are transmitted (319-325) at a rate lower than the estimated available rate.
In embodiments, in case a variation is detected in estimated available rate greater than a first predetermined value and before the step of detecting an increase in the round trip time, a step (307) is carried out of transmitting packets of lower importance level than the average of said importance levels by using the current estimated available rate and the round trip time is determined on the basis of the sending of those packets.

15 Claims, 5 Drawing Sheets

U.S. PATENT DOCUMENTS

| | | | |
|---|---|---|---|
| 7,796,517 B2 * | 9/2010 | Chen et al. ............... | 370/235 |
| 2001/0032269 A1 * | 10/2001 | Wilson ..................... | 709/235 |
| 2002/0154602 A1 * | 10/2002 | Garcia-Luna-Aceves et al. ..................... | 370/230 |
| 2002/0194361 A1 * | 12/2002 | Itoh et al. ................. | 709/233 |
| 2003/0091047 A1 * | 5/2003 | Pate et al. ................ | 370/392 |
| 2003/0231589 A1 | 12/2003 | Itoh | |
| 2004/0057446 A1 * | 3/2004 | Varsa et al. .............. | 370/412 |
| 2004/0184478 A1 | 9/2004 | Donescu | |
| 2004/0218531 A1 | 11/2004 | Cherian | |
| 2005/0044146 A1 | 2/2005 | Nassor | |
| 2005/0044483 A1 | 2/2005 | Maze | |
| 2005/0198676 A1 | 9/2005 | Henocq | |
| 2005/0228753 A1 | 10/2005 | Viger | |
| 2005/0278389 A1 | 12/2005 | Maze | |
| 2005/0286416 A1 * | 12/2005 | Shimonishi et al. ...... | 370/229 |
| 2006/0029037 A1 | 2/2006 | Chen | |
| 2006/0036813 A1 | 2/2006 | Henocq | |
| 2006/0259844 A1 * | 11/2006 | Kawada .................... | 714/748 |
| 2006/0271688 A1 | 11/2006 | Viger | |
| 2007/0079222 A1 * | 4/2007 | Kure et al. ............... | 714/776 |
| 2007/0115814 A1 * | 5/2007 | Gerla et al. .............. | 370/230 |
| 2007/0115848 A1 * | 5/2007 | Chean et al. ............. | 370/252 |
| 2008/0084821 A1 | 4/2008 | Maze | |
| 2008/0101253 A1 * | 5/2008 | Shvodian .................. | 370/252 |
| 2008/0294789 A1 * | 11/2008 | Nassor et al. ............ | 709/231 |
| 2010/0215053 A1 * | 8/2010 | Chakareski et al. ..... | 370/465 |
| 2011/0004808 A1 * | 1/2011 | Anandakumar et al. .. | 714/776 |
| 2011/0051637 A1 * | 3/2011 | Wise et al. ............... | 370/310 |

OTHER PUBLICATIONS

Z. Miao, et al., "Optimal Scheduling for Streaming of Scalable Media", Proceedings of Asilomar Conference on Signals, Systems and Computers, Pacific Grove, CA, Oct.-Nov. 2000.

French Search Report dated Aug. 6, 2008 issued during prosecution of related European application No. 0758316.

* cited by examiner

METHOD AND DEVICE FOR TRANSMITTING DATA

BACKGROUND

The present invention concerns a method and a device for transmitting data. It is directed, in particular, to video data packet scheduling that is adapted to the congestion control mechanism. More particularly still, the present invention has an application in a client-server application for video transmission over an unreliable packet network of which the bandwidth varies with time, to mitigate the limits of a congestion control mechanism.

A brief description is given below of a principle for congestion control. As networks have a limited bandwidth and are shared by several applications whose behavior is difficult to predict, it is necessary to control the rate of those applications. Moreover, without control, the network would continually be subject to congestion phenomena leading to data losses. These control methods are generally termed "methods of rate control or regulation" or "congestion control method. They enable each source to transmit data with a rate that is compatible with the capacities of the network at a given time. Most of the applications for transmission over networks are governed by TCP (acronym for "Transmission Control Protocol"). This protocol uses a congestion control algorithm termed AIMD (acronym for "Additive Increase, Multiplicative Decrease"). This algorithm consists of slowly increasing the transmission rate so long as no packet loss occurs. As soon as a packet loss is observed by the source, the rate thereof is divided by two. This algorithm enables sharing of the network resources. However, the TCP protocol was defined essentially for file transfer applications without time constraint. Furthermore, the algorithm for congestion control of TCP gives rise to variations in rate which are not compatible with applications requiring a quality of service that is constant or that slowly varies over time. This protocol is thus not adapted for the transfer of videos. For this type of application, different congestion control algorithms have therefore been sought that must however be compatible with TCP. To be precise, it was a matter of continuing to share the bandwidths available on the networks equitably, as TCP would do, but without the drawbacks identified in relation to that TCP. Even if certain time-constrained applications continued to use versions of AIMD modified to a greater or lesser extent, other more demanding applications used other protocols, such as "TFRC" (acronym for "TCP-Friendly Rate Control"). TFRC is a congestion control algorithm adapted to video applications. It provides equitable sharing of the available bandwidth between the TCP applications and the video applications. This algorithm is based on the following equation for estimating the bandwidth available on the network.

$$X = \frac{S}{R \times \sqrt{2 \times b \times p/3} + (t_{RTO} \times 3 \times \sqrt{3 \times b \times p/8} \times p \times (1 + 32 \times p^2))}$$

in which equation:
X is the estimation of the bandwidth available on the network,
R is the Round Trip Time, or "RTT", of the packets on the network,
b is the number of packets acknowledged by a TCP acknowledgement of receipt.
p is the loss event rate on the network and
$t_{RTO}$ is the period of wait before retransmission.

A loss event is a series of consecutive packet losses.

In the article "*Optimal Scheduling for Streaming of Scalable Media*", Z. Miao, A. Ortega, Proc. of Asilomar Conf. on Signals, Systems and Computers, Pacific Grove, Calif., October-November 2000, the authors propose a method of scheduling packets, each packet transporting an image in a given scalability layer. This method is based on a relatively complex evaluation of the importance of each packet depending on the distortion induced by the transported images, the dependencies between the images, the reception time constraints of the images, the error rate on the channel, the RTT, the rate available on the network, etc. The transmission order of the packets is then determined depending on their importance.

However, this method considers the value of rate estimated by its rate control algorithm as reliable. However, if the example is taken of TFRC and AIMD, these algorithms are not totally reliable. This is because the evaluation of the rate relies on the detection of losses on the network. If no loss occurs, these algorithms tend to increase the rate of the source, considering that the non-detection of losses implies freeing up of bandwidth on the network. Yet this non-detection of losses may be the consequence of two situations. In a first situation, it may, in fact, mean that bandwidth has been freed up on the network and that this available bandwidth may be used. In another situation, a source transmits at a rate very close to the rate available on the network, the rate of losses is practically zero and no congestion occurs. However, any further increase in rate would lead to packet losses.

As they are unable to differentiate between these two situations, the congestion control algorithms overassess the rate that is still available and the risk of losses to come increases. It would appear to be advantageous to avoid the transmission of important data during these risky periods. The document US 2003/231,589 proposes a solution based on the distinction between useful rate and overall rate of the source. The useful rate is here the rate of a video source alone. This source is followed by a redundancy generation module of FEC form (FEC being the acronym for "Forward Error Correction"). The combination of the rate of the source and the redundancy constitutes the overall rate. A congestion control algorithm re-updates the overall rate with a period P1 whereas the useful rate is re-updated only with a period P2 greater than P1. The rate of the redundancy is thus adjusted to the value of the difference between the useful rate and the overall rate. This solution makes it possible to not to directly increase the rate of the source at each increase of the overall rate. However, this system is not adaptive. The periods P1 and P2 are constant, which adversely affects the reactivity of the system. Furthermore, this method is implemented only in case of rate increase and provides no solution in case of rate reduction. Lastly, the objective of this method is to avoid rapid variations in the quality of the video.

SUMMARY

The present invention aims to mitigate these drawbacks. It aims in particular to improve the operation of the congestion control algorithm implemented by the server to improve the quality perceived by the user. It also aims to provide a mechanism that is simple to implement and which can be added to the existing congestion control mechanisms to improve them and that is fast for real-time applications. It is noted that the client is of a type known in the prior art.

To that end, according to a first aspect, the present invention concerns a method of transmitting data packets over a network, each data packet being associated with an importance level from among at least two importance levels, comprising a step of estimating rate available on the network, characterized in that it comprises a step of detecting a variation in estimated available rate and, in case a variation in estimated available rate is detected that is greater than a first predetermined value:

a step of detecting an increase in the round trip time on said network greater than a second predetermined value and in case an increase in the round trip time is detected, a step of transmitting data packets at a rate lower than the estimated available rate.

Thus, when there is a variation in available rate on the network, this variation is characterized by analyzing the round trip time and, according to the result of that analysis, the rate of data packets is adjusted. This rate is thus a function of the estimated risk taken on sending the data packets.

It is noted that, in particular embodiments, the invention is implemented in a module which is situated downstream of the rate control. This module thus takes as input the rate setting calculated according to the rate control algorithm, without this algorithm having been modified.

This invention thus makes it possible to improve the operation of the congestion control without modifying the congestion control algorithm but by considering the limits and imperfections thereof.

According to particular features, in case a variation is detected in estimated available rate greater than a first predetermined value and before the step of detecting an increase in the round trip time, a step is carried out of transmitting packets of lower importance level than the average of said importance levels.

Thus, in case of loss of packets at the time of the detecting steps, it is the packets of lesser importance that are lost.

According to particular features, during the step of transmitting packets of importance level lower than the average importance level, the current estimated available rate is used. Thus, if the risk of loss is not confirmed by the second detecting step, which concerns the round trip time, the rate that has been used is the estimated available rate and time has not been wasted in waiting for that confirmation.

According to particular features, during the step of detecting an increase in the round trip time, the round trip time is determined on the basis of the sending of packets transmitted during the step of transmitting packets of lower importance level.

The round trip time is thus analyzed for data packets transmitted with the new rate that followed the variation in rate.

According to particular features, during the step of transmitting data packets at a lower rate than the estimated available rate, if the variation in estimated available rate is an increase, the estimated available rate preceding the step of detecting the variation in estimated available rate is used.

According to particular features, during the step of transmitting data packets at a lower rate than the estimated available rate, if the variation in estimated available rate is a reduction, a fraction of the current estimated available rate is used.

According to particular features, during the step of transmitting data packets at a lower rate than the estimated available rate, a part of the current estimated available rate is used to transmit data packets and a part of the current estimated rate is used to transmit redundancy data packets.

According to particular features, the redundancy data are FEC data (FEC being the acronym for "Forward Error Correction").

By virtue of each of these provisions, the useful data packets are better protected against the errors arising in case of loss.

According to particular features, the method of the present invention, as succinctly set forth above comprises a step of congestion control implementing TFRC (acronym for "TCP-Friendly Rate Control") to provide said estimation of available rate.

The implementation of the present invention is particularly adapted to counter the defects in TFRC.

According to a second aspect, the present invention concerns a device for transmitting data packets over a network, each data packet being associated with an importance level from among at least two importance levels, comprising a means for estimating rate available on the network, characterized in that it comprises a means for detecting a variation in estimated available rate that is greater than a first predetermined value and a transmission means that is adapted, in case of detection of a variation in estimated available rate:

to detect an increase in the round trip time greater than a second predetermined value on said network and in case an increase in the round trip time is detected, to transmit data packets at a rate lower than the estimated available rate.

According to a third aspect, the present invention concerns a computer program loadable into a computer system, said program containing instructions enabling the implementation of the method of the present invention as succinctly set forth above.

According to a fourth aspect, the present invention concerns an information carrier readable by a computer or a microprocessor, removable or not, storing instructions of a computer program, characterized in that it enables the implementation of the method of the present invention as succinctly set forth above.

As the advantages, objects and features of this device, of this computer program and of this information carrier are similar to those of the method, as succinctly set forth above, they are not repeated here.

Other advantages, objects and features of the present invention will emerge from the following description, given, with an explanatory purpose that is in no way limiting, with reference to the accompanying drawings, in which:

DETAILED DESCRIPTION

Figure 1:
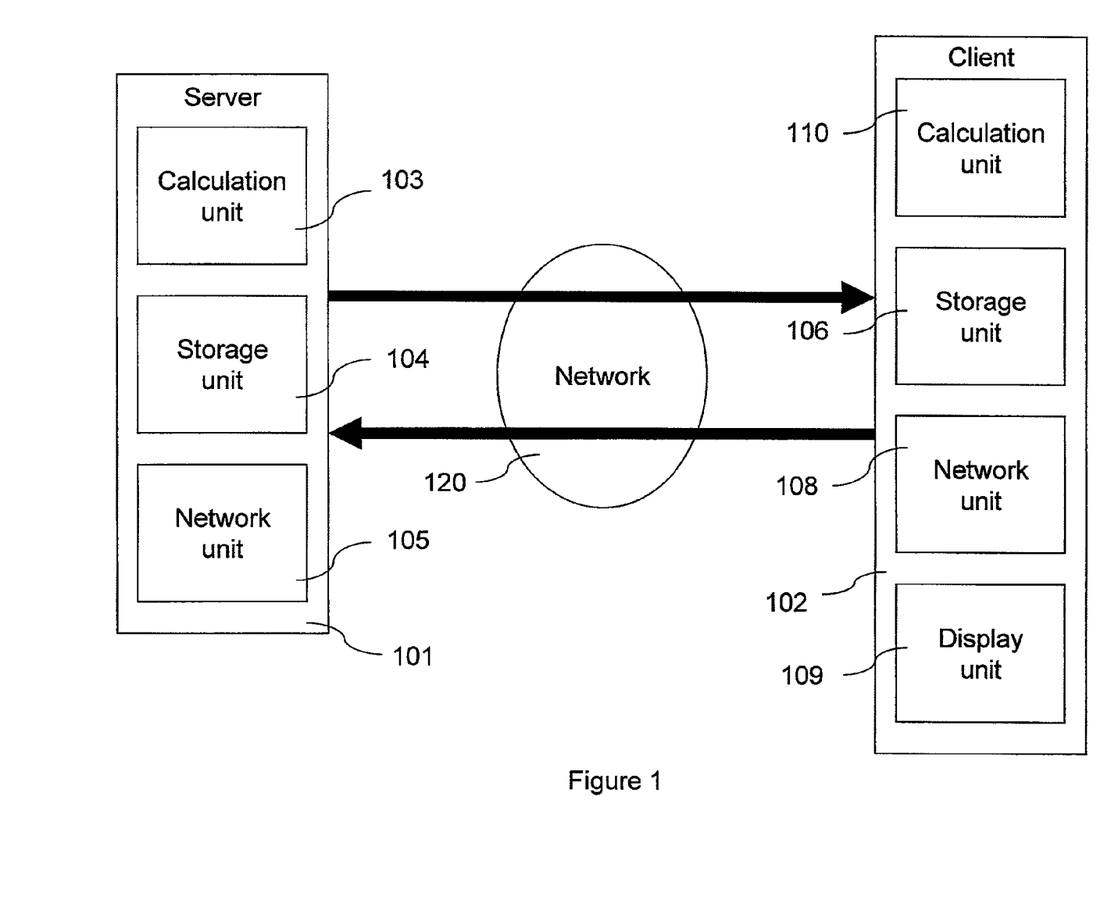
FIG. 1 is a diagram of the systems implemented for the transmission of data.

As illustrated in FIG. 1, a video transmission system implementing the method of the present invention is constituted by a server 101 and by a client 102. The server 101 is constituted by a storage unit 104 containing videos compressed beforehand and computer programs implemented by the server 101, by a calculation unit 103 implementing those programs and by a network unit 105 which has the task of transmitting the video data over the network 120, of known type. An acquisition unit (not shown) could be inserted into the server 101. In this case, the calculation unit 103 would implement a computer program for video compression, that program being stored on the storage unit 104. The client 102 is constituted by a storage unit 106 storing the programs implemented by the client, including a program for decompressing the video data, a calculation unit 110 implementing those programs, a network unit 108 enabling the reception of the video data and a display unit 109 such as a monitor making it possible to view the received video.

The server 101 transmits data over the packet network 120. In this embodiment, the application layer protocol RTP/RTCP (acronym for "Real-time Transport Protocol/Real-time Transport Control Protocol") is used to transmit the data from the server 101 to the client 102, but also to transmit transmission reports from the client 102 to the server 101.

Figure 2:
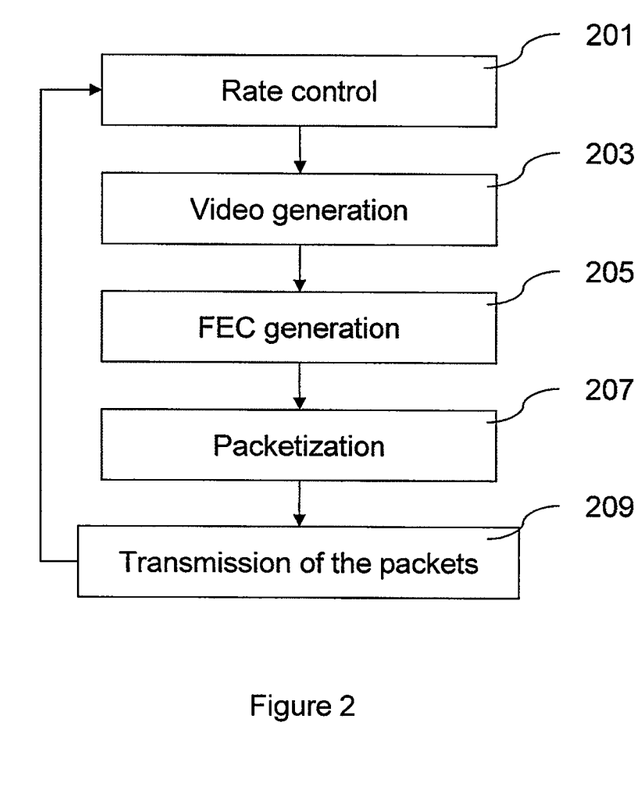
FIG. 2 is a diagram of the steps implemented for the transmission of data.

As may be observed in FIG. 2, the transmission of packets comprises a step 201 of estimating the available bandwidth in TFRC based on the equation $$X = \frac{S}{R \times \sqrt{2 \times b \times p/3} + (t_{RTO} \times 3 \times \sqrt{3 \times b \times p/8} \times p \times (1 + 32 \times p^2))}$$

detailed above. As set forth above, the use of this equation requires the knowledge of information such as the rate of loss events (p), the RTT (R), the number of packets acknowledged by a TCP acknowledgement of receipt (b), and the period of wait before retransmission ($t_{RTO}$). b is a constant of the network. $t_{RTO}$ is approximated by 4WR. It is assumed here that the client 102 inserts, in the RTCP reports, information representing the current rate of loss events (p). This functionality is only rendered possible with the use of dedicated RTCP reports but of known type (see, for example, the document "Extended RTP Profile for Real-time Transport Control Protocol (RTCP)-Based Feedback (RTP/AVPF) RFC4585. http://www.rfc-editor.org/rfcrfc4585.txt").

The RTT is calculated by inserting in the RTCP reports the time passed between the arrival of a packet and the departure of the acknowledgement corresponding to that packet. In this way, the server 101, knowing the instant of departure of a packet and the instant of arrival of its acknowledgement, can calculate the RTT. By inserting all this information into the equation $$X = \frac{S}{R \times \sqrt{2 \times b \times p/3} + (t_{RTO} \times 3 \times \sqrt{3 \times b \times p/8} \times p \times (1 + 32 \times p^2))}$$

the server 101 obtains an estimate of the available rate on the network termed "estimated available rate".

Next, during a step 203, the video data are generated. These data may be generated in two manners. The first consists of extracting them from an existing video file. This solution is particularly advantageous in the case of a video compressed with a scalable video coder. More particularly it is possible to extract a portion from the bitstream of a scalable video that corresponds to the current estimated available rate. The second solution consists of compressing the video, it being possible for this to be generated by a video acquisition unit. The regulation of the rate of the data packets of the video to make it match the current estimated available rate is then carried out during its compression. This step is followed, optionally, by a step 205 of generating redundancy in the form of FEC or data for error correction by anticipation. A simple method of generating FEC consists of applying a systematic Reed-Solomon coder to the video data in order to generate redundancy data. A description is given later, with reference to FIG. 4, of how the rate of the redundancy data is regulated in embodiments of the method of the present invention.

Next, during a step 207, the data generated is inserted into RTP packets. It is to be noted that the video data and the FEC redundancy data are transported in different packets. These packets are next transported over the network 120, at a step 209 during which the method of the present invention is implemented.

Figure 3:
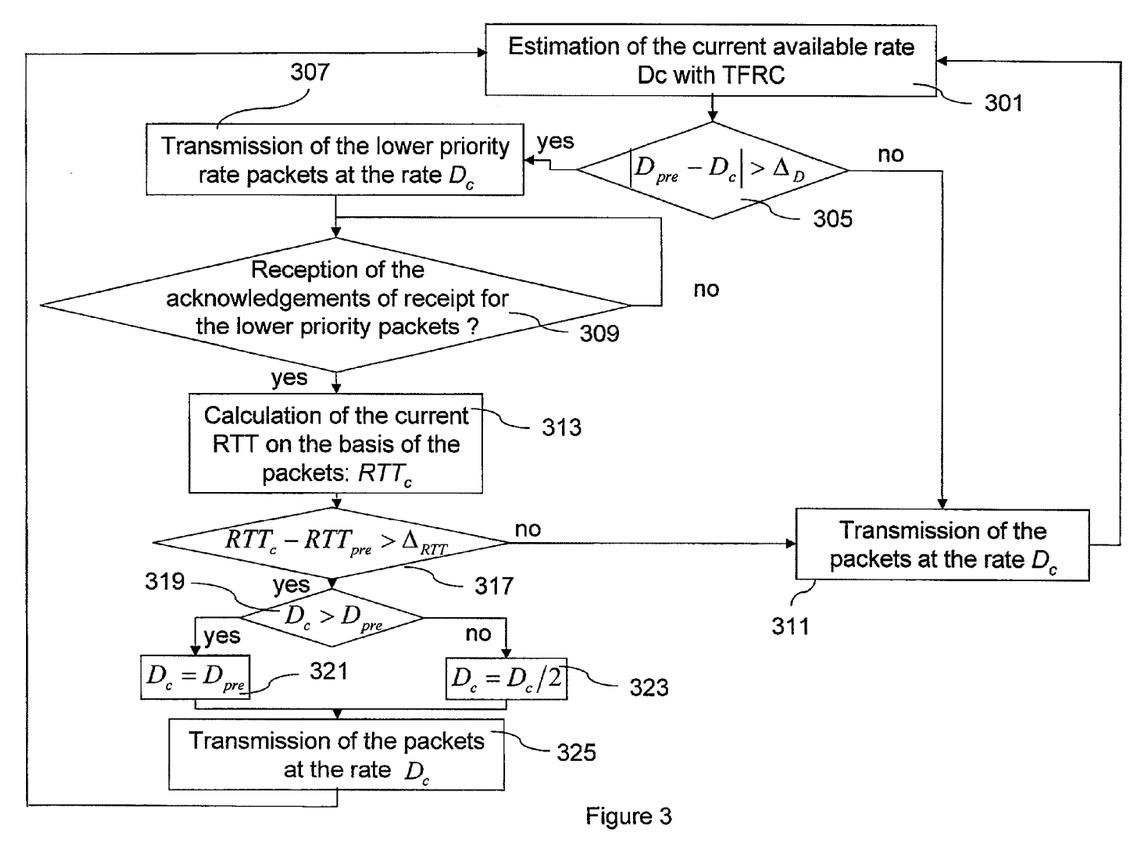
FIG. 3 represents, in logigram form, steps implemented in a first embodiment of the method of the present invention.

As illustrated in FIG. 3, in the implementation of a first embodiment of the method of the present invention it is assumed that those packets are of unequal importance, the importance of a packet depending on its content, as set forth above.

For example, in the case of the transmission of a non-scalable video such as a video according to the H.264 standard, the packets transporting the INTRA images art considered as more important than packets transporting predicted images. In the same way, packets transporting predicted images that are constituted by a high number of INTRA macroblocks are considered as more important than packets transporting predicted images constituted by few INTRA macroblocks. This is because the INTRA images and macroblocks are important because they are capable of re-synchronizing a compressed video sequence in case of packet losses.

According to another example, in the case of a transmission of a scalable video using for example the SVC format, it is possible to transmit a video constituted by several scalability layers including a base layer and at least one improvement layer. A packet transporting data of the base layer is considered as more important. This is because, in SVC scalability, much data of the improvement layers make reference, directly or indirectly, to the base layer. Moreover, the base layer is important since it enables the user to receive at least the minimum quality of the video sequence.

The data of the improvement layers are considered as less important. For example, the levels of importance of the data decrease according to the improvement layer to which they belong.

According to another example, as set forth above, a more complex evaluation of the importance of each packet is implemented depending on the distortion induced by the transported images, dependencies between the images, reception time constraints of the images and/or the error rate on the channel.

In the entire description, only two levels of importance are considered. However, the person skilled in the art will know how to easily adapt the teaching of the present invention to a higher number of levels of importance. For example, an average importance level making it possible to differentiate the data packets considered as the most or the least important makes it possible to get back to the embodiments presented here. Alternatively, the implementation of a plurality of threshold values replacing each of the threshold values mentioned below, makes it possible to manage more than two levels of importance.

In the first embodiment, the method of the present invention commences with a step 301 during which the estimation of the rate available on the network is carried out, which estimation is denoted "$D_c$". Next, during a step 305, it is determined whether the absolute value of the difference between that current estimated available rate $D_c$ and the preceding value of that rate is greater than a first threshold value $\Delta_D$, which is empirically predetermined. Otherwise, it is considered that the rate is stable and the packets containing the data are transmitted over the network, at the rate $D_c$, during a step 311. Step 311 is followed by a return to the step 301 for a new evaluation of the rate.

If the result of step 305 is positive, that is to say if the variation in estimated available rate is high, a set of packets to transmit is processed, during a step 307.

The importance of the packets being defined as set forth above, the packets of least importance are transmitted at the rate $D_c$ in a first phase. This is because finding that the variation in rate is high is an indication of entry into a phase of uncertainty as to the estimation of the rate, also termed "risky period". This type of scheduling of the packets has two advantages. The first is to transmit packets of which the possible loss would have a low visual impact during the periods in which the rate of loss is liable to increase. The second is that the transmission of these packets enables the evolution of the state of the network to be measured during a step 313.

During a step 309, an acknowledgement of receipt is awaited from the client, that corresponds to at least one packet of low importance transmitted during the step 307. This acknowledgement of receipt enables the server to evaluate the current round trip time, or "$RTT_c$" during the step 313. During a step 317, it is determined whether the difference between the value of $RTT_c$ and the preceding value of RTT, denoted $RTT_{pre}$, is greater than a second value of predetermined threshold, denoted $\Delta_{RTT}$. Otherwise, during a step 311, the transmission of all the packets is continued at the rate $D_c$, independently of their importance. If yes, this means that the RTT time has increased abnormally, which is a new indication that the queues in the routers of the network are in course of saturation. In this case, if the transmission were to continue at that rate $D_c$, congestion could arise and lead to losses of packets.

Next, during a step 319, it is determined whether the current rate $D_c$ is greater than the previous rate $D_{pre}$. If yes, during a step 321, the transmission at the rate $D_c$ estimated at the step 301 is stopped to return to the previous rate. A rate is thus returned to that had not caused congestion previously. If $D_c$ is less than $D_{pre}$, a fraction of the value of the current estimated rate is determined, for example, the value of the current rate is divided by two, during a step 323. This step 323 amounts to considering that the drop in rate of step 301 is insufficient to avoid congestion. That drop is thus amplified.

At step 325 the packets are transmitted at the rate determined during one of the steps 321 or 323, independently of their importance, and step 301 is returned to for a new estimation of the rate $D_c$.

In both the cases of the steps 321 and 323, it is noted that the rate estimation of the congestion control algorithm has been called into question. The implementation of the present invention thus enables the reactivity of the system to be increased. This is all the more the case with the TFRC congestion control algorithm, in which the rate estimations are not only the result of the equation $$X = \frac{s}{R \times \sqrt{2 \times b \times p/3} + (t_{RTO} \times 3 \times \sqrt{3 \times b \times p/8} \times p \times (1 + 32 \times p^2))}$$

but also of a weighted average taking into account past measurements. In addition, it has been avoided to transmit important packets during the risky periods.

Figure 4:
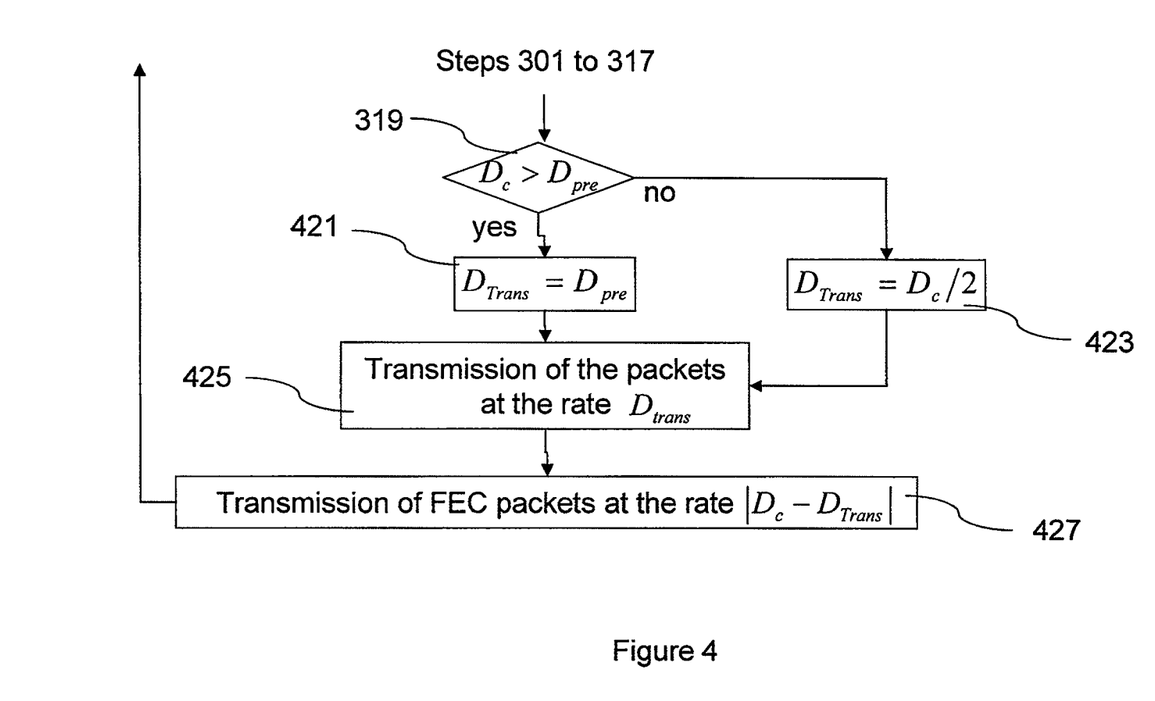
FIG. 4 represents, in logigram form, steps implemented in a second embodiment of the method of the present invention

FIG. 4 concerns a second embodiment of the present invention, with implementation of FEC. As the inventors had found that the non-compliance, by a source with a rate estimated by TFRC, could induce phenomena of oscillation in the estimation of that rate, the high variations in the rate giving rise to wide variations in quality, they produced the second embodiment illustrated in FIG. 4.

FIG. 4 adopts steps 301 to 319 of FIG. 3. If the result of step 319 is positive, that is to say if $D_c > D_{pre}$, during a step 421, the rate $D_{trans}$ corresponding to the rate of transmission of the video data takes the value $D_{pre}$. On the other hand, if the result of step 319 is negative, that is to say if $D_c < D_{pre}$, during a step 423, $D_{trans}$ takes a value equal to a fraction of the value of $D_c$, for example $D_c/2$. The steps 421 and 423 are each followed by a step 425 during which the packets containing the video are transmitted at the rate $D_{trans}$ independently of their importance. Next, at a step 427, redundancy packets are generated, for example by entering the video packets as input to a systematic Reed-Solomon coder. The rate of this redundancy is fixed to the absolute value of the difference between $D_c$ and $D_{trans}$. These redundancy packets are themselves transmitted over the network during the step 427. Next, step 301 is returned to.

It is noted that in this second embodiment, the server complies with the rate of TFRC, whereas the video continues to follow a different rate depending on the information collected after the transmission of the first packets further to a high variation in rate. In addition, it has, here too, been avoided to transmit important packets during the risky periods.

Figure 5:
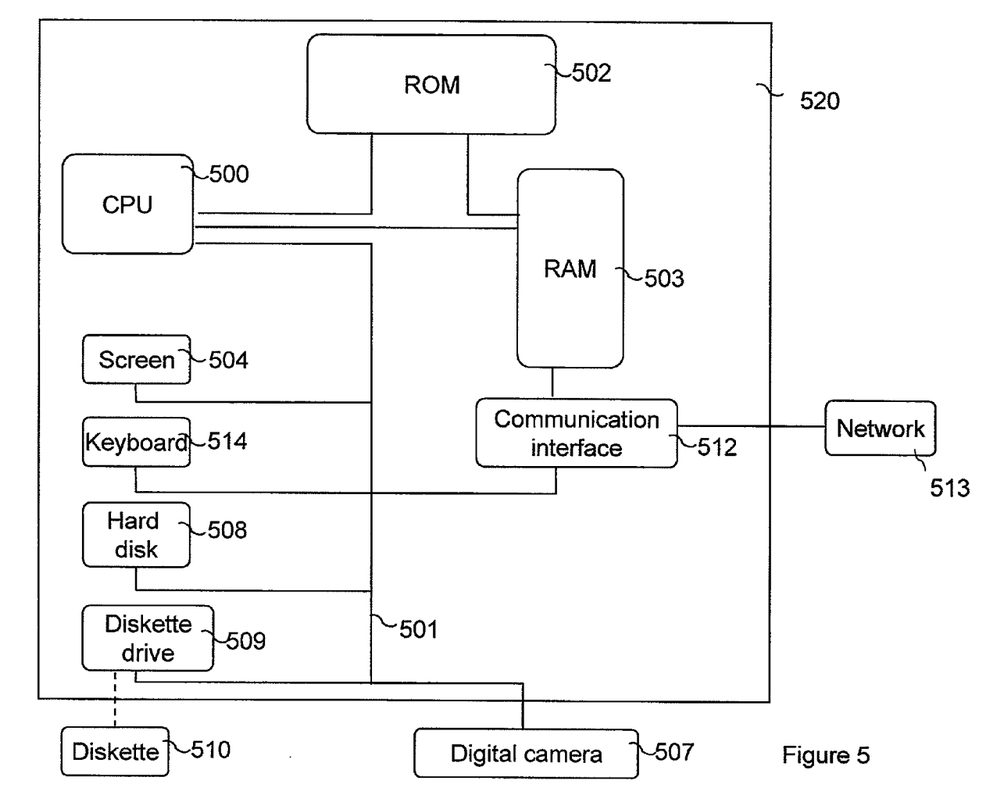
FIG. 5 is a diagram of a particular embodiment of the device of the present invention.

As represented in FIG. 5, a device implementing the invention is, for example, a microcomputer 520 connected to different peripherals, for example a digital camera 507 (or any image acquisition or storage means) connected to a graphics card and supplying information to be processed according to the invention. The device could also be a digital camera connected to a network for example a video surveillance camera.

The device 520 comprises a communication interface 512 connected to a network 513 able to transmit digital data to be processed or conversely to transmit data processed by the device. The device 520 optionally comprises a storage means 508 such as a hard disk or a drive 509 for a disk 510. This disk 510 may for example be a diskette, a CD-ROM, or a DVD-ROM. The disk 510 like the hard disk 508 can contain data processed according to the invention as well as the program or programs implementing the invention which, once read by the device 520, will be stored on the hard disk 508. According to a variant, the program enabling the device to implement the invention can be stored in read only memory 502 (which may be referred to as ROM). In a second variant, the program can be received in order to be stored in an identical manner to that described previously via the communication network 513.

This same device optionally has a screen 504 for displaying the data to be processed and/or serving as an interface with the user, who can thus parameterize certain processing modes, using the keyboard 514 or any other means (a mouse for example).

The central processing unit 500, referred to as "CPU" in FIG. 5, executes the instructions relating to the implementation of the invention, which are stored in the read only memory 502 or in the other storage means. On powering up, the processing programs stored in a non-volatile memory, for example the ROM 502, are transferred into the random access memory RAM 503, which will then contain the executable code of the invention, as well as registers for storing the variables necessary for implementing the invention.

More generally, an information storage means, which can be read by a computer or by a microprocessor, integrated or not into the device, and which may possibly be removable, stores a program implementing the transmission method of the present invention.

The communication bus 501 enables communication between the different elements included in the microcomputer 520 or connected to it. The representation of the bus 501 is not limiting and, in particular, the central processing unit 500 is able to communicate instructions to any element of the microcomputer 520 directly or via another element of the microcomputer 520.

The invention claimed is:

1. A method of transmitting data packets over a network, each data packet being associated with an importance level from at least two importance levels, comprising:
  a step of estimating a rate available on the network, comprising:
    a step of detecting a variation in the estimated available rate and, in a case where a value representative of a variation in the estimated available rate is detected that is greater than a first predetermined value representative of a high variation:
    a step of transmitting first data packets at the estimated rate available on the network; and
    a step of detecting an increase in the round trip time on said network greater than a second predetermined value representative of an abnormal increase, the detection being based on the transmitted first data packets; and
    in a case where an increase in the round trip time is above the second predetermined value, a step of transmitting the next data packets at a rate lower than the estimated available rate,
    wherein the transmitted first data packets contain packets of a lower importance level than an average of said at least two importance levels, the packet importance associated with each data packet depending on contents of the data packet.

2. The method according to claim 1, wherein, during the step of detecting an increase in the round trip time, the round trip time is determined on the basis of the sending of the packets of the lower importance level.

3. The method according to claim 1, wherein, during the step of transmitting data packets at a lower rate than the estimated available rate, if the variation in the estimated available rate is an increase, the estimated available rate preceding the step of detecting the variation in the estimated available rate is used.

4. The method according to claim 1, wherein, during the step of transmitting data packets at a lower rate than the estimated available rate, if the variation in the estimated available rate is a reduction, a fraction of the current estimated available rate is used.

5. The method according to claim 1, wherein, during the step of transmitting data packets at a lower rate than the estimated available rate, a fraction of the current estimated available rate is used to transmit data packets and a fraction of the current estimated rate is used to transmit redundancy data packets.

6. The method according to claim 5, wherein the redundancy data packets are FEC (Forward Error Correction) data.

7. The method according to claim 1, further comprising a step of congestion control implementing TFRC (TCP-Friendly Rate Control) to provide said estimation of the available rate.

8. A device for transmitting data packets over a network, each data packet being associated with an importance level from at least two importance levels, comprising:
  a processor; and
  a memory on which is stored computer-executable code of a program to be executed by the processor, the program comprising:
  code for estimating a rate available on the network, comprising:
    code for detecting a variation in the estimated available rate and,
    in a case where a value representative of a variation in the estimated available rate is detected that is greater than a first predetermined value representative of a high variation:
    code for transmitting first data packets at the estimated rate available on the network; and
    code for detecting an increase in the round trip time greater than a second predetermined value representative of an abnormal increase, the detection being based on the transmitted first data packets; and
    in a case where an increase in the round trip time is above the second predetermined value, transmitting the next data packets at a rate lower than the estimated available rate,
    wherein the transmitted first data packets contain packets of a lower importance level than an average of said at least two importance levels, the packet importance associated with each data packet depending on contents of the data packet.

9. The device according to claim 8, wherein in the detecting an increase in the round trip time, the round trip time is determined on the basis of the sending of the packets of the lower importance level.

10. The device according to claim 8, wherein during the transmitting data packets at a lower rate than the estimated available rate, if the variation in the estimated available rate is an increase, the estimated available rate preceding the detecting the variation in the estimated available rate is used.

11. The device according to claim 8, wherein during the transmitting data packets at a lower rate than the estimated available rate, if the variation in the estimated available rate is a reduction, a fraction of the current estimated available rate is used.

12. The device according to claim 8, wherein during the transmitting data packets at a lower rate than the estimated available rate, a fraction of the current estimated available rate is used to transmit data packets and a fraction of the current estimated rate is used to transmit redundancy data packets.

13. The device according to claim 12, wherein the redundancy data are FEC (Forward Error Correction) data.

14. The device according to claim 8, further comprising a code for congestion control implementing TFRC (TCP-Friendly Rate Control) to provide said estimation of the available rate.

15. A non-transitory computer-readable storage medium on which is stored code of a computer program that can be loaded into a computer system, said code comprising:
  code for estimating a rate available on the network, comprising:
    code for detecting a variation in the estimated available rate and,
    in a case where a value representative of a variation in the estimated available rate is detected that is greater than a first predetermined value representative of a high variation;

code for transmitting first data packets at the estimated rate available on the network; and code for detecting an increase in the round trip time greater than a second predetermined value representative of an abnormal increase, the detection being based on the transmitted first data packets; and in a case where an increase in the round trip time is above the second predetermined value, transmitting the next data packets at a rate lower than the estimated available rate, wherein the transmitted first data packets contain packets of a lower importance level than an average of said at least two importance levels, the packet importance associated with each data packet depending on contents of the data packet.

* * * * *